Patented Nov. 19, 1929

1,736,375

UNITED STATES PATENT OFFICE

SAMUEL T. SHERRICK, OF DENVER, COLORADO, ASSIGNOR TO EDWIN S. KASSLER, JR., AND THOMAS P. CAMPBELL, OF DENVER, COLORADO, TRUSTEES

CLEANING COMPOSITION

No Drawing.      Application filed October 25, 1927. Serial No. 228,690.

This invention relates to a composition of matter particularly adapted for use in cleaning walls and other surfaces.

The main object of the invention is to provide a composition of the above-stated character having superior absorbent and plastic properties and a stability both physical and chemical which adapts it particularly for the purposes for which it is intended.

A composition made in accordance with my invention is furthermore distinguished by its great resistance to deteriorative influences.

A further object of the invention resides in the provision of a composition of matter for use as a cleaner, which is very simple and inexpensive both in preparation and in use.

With the above and other objects in view, the composition has for its principal ingredient a colloidal or jelly-forming clay such as bentonite ($Al_2O_3.6SiO_2.5H_2O$) or other hydrated silicate of aluminum.

The composition forming the subject of the invention involves the use of a plastic mineral substance containing as components, a gelatinous colloid, a mineral salt and an insoluble clay in a state of fine subdivision, and bentonite or other clay of similar nature lends itself particularly to the production of the desired substance especially when subjected to an acid treatment for the production of ortho-silicic acid. The natural clays contain a considerable amount of combined silicic acid and by treating the material with a comparatively stronger acid, part or all of the silicic acid may be displaced and precipitated, in acidic environment, as gelatinous ortho-silicic acid ($Si(OH)_4$).

Sulfuric acid is well adapted for the acid treatment of the clays although other acids, particularly those which form a soluble salt of aluminum, such as hydrochloric or glacial acetic, may be used in different proportions with satisfactory results.

The clays after the acid treatment yield a compound of colloidal clay, aluminum sulfate, ortho-silicic acid and water that meets all the requirements for the production of a cleaning compound of the above-described properties and also for the production of other materials such as an adhesive, lubricant compounds or polishing compounds as will be described in other applications for patent.

To make a cleaning compound by the use of a colloidal clay such as bentonite, acid treated, flour and a salt (NaCl) are added in addition to the acid, and the following proportions have been found to give highly satisfactory results: bentonite, 2 parts; sulfuric acid (concentrated C. P.), ½ part; flour, 1 part; salt (NaCl), 2 parts.

The same or similar proportions may be adhered to in mixing the colloidal clay, flour, and salt without the acid.

The mixture is made up cold, then heated to boiling in the presence of a large excess of water. Upon cooling, the excess water may be drained off or decanted after settling, leaving a product ready for use as a cleaner.

Having thus described my invention, what I claim and desire to secure by Letters Patent is:—

1. The method of producing a composition of matter, consisting in treating a colloidal clay with acid to displace silicic acid in the clay as ortho-silicic acid, intermixing the clay with flour and salt, bringing the mixture to its boiling point in the presence of water, and separating excess water after settling.

2. A composition of matter comprising acid-treated bentonite, flour and salt.

3. A composition of matter comprising acid-treated bentonite, flour, salt and water.

4. A composition of matter comprising acid-treated bentonite two and one-half parts, flour one part, and salt two parts.

In testimony whereof I have affixed my signature.

SAMUEL T. SHERRICK.